US012292717B2

United States Patent
Zhang et al.

(10) Patent No.: US 12,292,717 B2
(45) Date of Patent: May 6, 2025

(54) METHOD, DEVICE, EQUIPMENT AND STORAGE MEDIUM FOR GLOBAL NAVIGATION SATELLITE SYSTEM TIME SYNCHRONIZATION

(71) Applicant: Black Sesame Technologies Inc., San Jose, CA (US)

(72) Inventors: Jianfeng Zhang, Neijiang (CN); Zixiang Wang, Chengdu (CN); Qingpeng Gao, Chengdu (CN)

(73) Assignee: Black Sesame Technologies Inc., San Jose, CA (US)

( * ) Notice: Subject to any disclaimer, the term of this patent is extended or adjusted under 35 U.S.C. 154(b) by 804 days.

(21) Appl. No.: 17/561,094

(22) Filed: Dec. 23, 2021

(65) Prior Publication Data

US 2022/0397869 A1  Dec. 15, 2022

(30) Foreign Application Priority Data

Jun. 9, 2021  (CN) .......................... 202110642301.4

(51) Int. Cl.
 *G04R 20/04*  (2013.01)
 *G01S 19/23*  (2010.01)
 (Continued)

(52) U.S. Cl.
 CPC ............ *G04R 20/04* (2013.01); *G01S 19/235* (2013.01); *G01S 19/256* (2013.01); *G04R 20/06* (2013.01)

(58) Field of Classification Search
 CPC ........ G04R 20/04; G04R 20/06; G01S 19/256
 See application file for complete search history.

(56) References Cited

U.S. PATENT DOCUMENTS

2009/0271110 A1  10/2009 Sugiura
2016/0269170 A1*  9/2016 Kurby ................... H04L 7/0012
 (Continued)

FOREIGN PATENT DOCUMENTS

CN  101430372 A  5/2009
CN  101969690 A  2/2011
 (Continued)

OTHER PUBLICATIONS

Yuan Feng, GPS-based Tim Control System and Algorithm, Computer Knowledge and Technology, Mar. 2017, vol. 13, No. 9.
 (Continued)

*Primary Examiner* — Edwin A. Leon
*Assistant Examiner* — Jason M Collins
(74) *Attorney, Agent, or Firm* — Timothy Wang; Ni, Wang & Massand, PLLC

(57) ABSTRACT

A method, device, computer equipment and storage medium for GNSS time synchronization are disclosed. The method includes: receiving data packet of NMEA protocol, reading a valid UTC time from data packet of NMEA protocol, and storing the read valid UTC time in a time synchronization controller; receiving PPS signal, capturing a local time output by local clock when PPS signal is generated, and storing the local time in the time synchronization controller; reading a last local time stored before the current local time and reading the stored latest UTC time as a UTC time corresponding to the last local time when the time synchronization controller receives the current local time; and determining, by the time synchronization controller, a local time correction amount according to the last local time and the UTC time corresponding to the last local time, and correcting the local clock according to the local time correction amount.

11 Claims, 6 Drawing Sheets

(51) Int. Cl.
*G01S 19/25* (2010.01)
*G04R 20/06* (2013.01)

(56) References Cited

U.S. PATENT DOCUMENTS

| | | | | |
|---|---|---|---|---|
| 2016/0274243 | A1* | 9/2016 | Maki | G01S 19/14 |
| 2020/0106542 | A1* | 4/2020 | Liu | G01S 13/931 |
| 2021/0356915 | A1* | 11/2021 | Wang | G04R 20/02 |
| 2022/0146688 | A1* | 5/2022 | Kim | G04G 7/00 |
| 2022/0283316 | A1* | 9/2022 | Zampetti | G01S 19/39 |

FOREIGN PATENT DOCUMENTS

| | | |
|---|---|---|
| CN | 102946289 A | 2/2013 |
| CN | 106405579 A | 2/2017 |
| CN | 107037722 A | 8/2017 |
| CN | 108536003 A | 9/2018 |
| CN | 111585680 A | 8/2020 |
| WO | 2013102324 A1 | 7/2013 |

OTHER PUBLICATIONS

Yong Wu, Real-time correction algorithm for reference source based on pulse per second signal of GPS, Infrared and Laser Engineering, Dec. 2014, vol. 43, No. S.

Chao Zhang, Yong Zheng, Research of Accurate Timing by Using GPS OEM Chip, Journal of Information engineering university, vol. 2 No. 4, Dec. 2001.

* cited by examiner

METHOD, DEVICE, EQUIPMENT AND STORAGE MEDIUM FOR GLOBAL NAVIGATION SATELLITE SYSTEM TIME SYNCHRONIZATION

CROSS REFERENCE TO RELATED APPLICATION

This patent application claims the benefit and priority of Chinese Patent Application No. 202110642301.4 filed on Jun. 9, 2021, the disclosure of which is incorporated by reference herein in its entirety as part of the present application.

TECHNICAL FIELD

The present disclosure relates to the technical field of time synchronization, and more specifically, to a method, device, computer equipment and storage medium for global navigation satellite system time synchronization.

BACKGROUND ART

With the rapid development of automatic driving technology and the improvement of the intelligent level of road vehicles and road facilities, the demand for high-precision timing of global navigation satellite system (GNSS) is becoming more and more obvious. For example, in the automatic driving scenario, the road participating vehicles usually need to receive the road information released by roadside facilities or other vehicles. This information usually has a high timeliness. Therefore, the vehicle receiving the information is required to be highly consistent with the time of roadside facilities, for example, the error should be less than 1 ms, otherwise it is very easy to mislead road vehicles and cause traffic accidents. It is impossible to share a clock source among vehicles and between vehicles and roadside facilities. It is necessary to synchronize the time of a large amount of equipment at low cost, high precision, timely and reliably. GNSS timing is a common technical means in the field of time synchronization. Global navigation satellite systems include global positioning system (GPS), Beidou navigation satellite system (BDS), GLONASS satellite navigation system (GLONASS), Galileo satellite navigation system (GALILEO), and other satellite navigation systems. The cost of GNSS receiver is low, and the error of output pulse per second (PPS) signal can be controlled within 100 ns, which can meet the time synchronization requirements of automatic driving.

In a known method for GNSS time synchronization, when time synchronization is performed on the processor chip, the processor chip can read the data packet of National Marine Electronics Association (NMEA) protocol after receiving the data packet of NMEA protocol from the GNSS receiver and parse the data packet of NMEA protocol. After obtaining the Universal Time Coordinated (UTC) time, the obtained UTC time is directly synchronized to the local time of the processor chip. However, the time when the GNSS receiver outputs the data packet of NMEA protocol is not determined, and it may be recorded in the data packet for more than 100 ms before output. In addition, the processor chip has a delay in receiving and parsing the data packet of NMEA protocol. When the receiving and parsing operations are carried out on the operating system of the processor chip, it is also affected by the system task scheduling, resulting in the uncertainty of the time when the UTC time is obtained, which makes the synchronization accuracy of the UTC time to the local time low.

In the above existing method for GNSS time synchronization, the time synchronization accuracy still has an improved space.

SUMMARY

Based on this, in view of the above technical problems, it is necessary to provide a method, device, computer equipment and storage medium for global navigation satellite system (GNSS) time synchronization that can improve the time synchronization accuracy.

In a first aspect, the disclosure provides a method for GNSS time synchronization, which includes the following steps:

receiving a data packet of National Marine Electronics Association (NMEA) protocol, reading a valid Universal Time Coordinated (UTC) time from the data packet of NMEA protocol, and storing the read valid UTC time in a time synchronization controller;

receiving a pulse per second (PPS) signal, capturing a local time output by a local clock at a time when the PPS signal is generated, and storing the local time in the time synchronization controller;

reading a last local time stored before the current local time and reading the stored latest UTC time as a UTC time corresponding to the last local time when the time synchronization controller receives the current local time; and determining, by the time synchronization controller, a local time correction amount according to the last local time and the UTC time corresponding to the last local time, and correcting the local clock according to the local time correction amount.

In one embodiment, the receiving a data packet of NMEA protocol, reading a valid UTC time from the data packet of NMEA protocol, and storing the read valid UTC time in a time synchronization controller includes: waiting for the data packet of NMEA protocol; parsing the data packet of NMEA protocol to obtain a current positioning state and a current UTC time whenever the data packet of NMEA protocol is received; and judging whether the current positioning state is a valid positioning state; when the current positioning state is not a valid positioning state, returning to the waiting for the data packet of NMEA protocol; when the current positioning state is a valid positioning state, determining the current UTC time is the valid UTC time, transmitting the current valid UTC time into the time synchronization controller, and then returning to the step of the waiting for the data packet of NMEA protocol; and storing the UTC time with a maximum time value as the latest UTC time whenever the time synchronization controller receives a UTC time.

In one embodiment, the step of parsing the data packet of NMEA protocol to obtain a current positioning state and a current UTC time whenever the data packet of NMEA protocol is received includes: whenever a data packet of NMEA protocol is received, if the parsing of the last data packet of NMEA protocol is not completed upon receiving a currently received data packet of NMEA protocol, stopping parsing the last data packet of NMEA protocol and parsing the currently received data packet of NMEA protocol to obtain the current positioning state and the current UTC time; and if the parsing of the last data packet of NMEA protocol is completed upon receiving a currently received data packet of NMEA protocol, continuing to parse the currently received data packet of NMEA protocol to obtain the current positioning state and the current UTC time.

In one embodiment, the storing the UTC time with a maximum time value as the latest UTC time whenever the time synchronization controller receives a UTC time includes: judging, by the time synchronization controller, whether the current time synchronization controller is in a free state or a busy state whenever the time synchronization controller receives a UTC time; wherein the busy state indicates that the time synchronization controller is using the last local time and the latest UTC time to perform a correction on the local clock; storing the UTC time with the maximum time value as the latest UTC time when the time synchronization controller is in the free state; and waiting for the time synchronization controller to switch to the free state and storing the UTC time with the maximum time value as the latest UTC time when the time synchronization controller is in the busy state.

In one embodiment, the storing the UTC time with a maximum time value as the latest UTC time whenever the time synchronization controller receives a UTC time includes: whenever the time synchronization controller receives a UTC time, if there is no stored UTC time, storing the received UTC time as the latest UTC time; if there is any stored UTC time, overwriting the stored UTC time with the received UTC time as the latest UTC time when the received UTC time is greater than the stored UTC time, and discarding the received UTC time and reserving the stored UTC time as the latest UTC time when the received UTC time is less than the stored UTC time. The method further includes: deleting the latest UTC time after the time synchronization controller determines the local time correction amount according to the last local time and the latest UTC time.

In one embodiment, the receiving a PPS signal, capturing a local time output by a local clock at a time when the PPS signal is generated, and storing the local time in the time synchronization controller includes: waiting for the PPS signal; capturing the local time output by the local clock at the time when the PPS signal is generated, triggering a PPS interrupt response, and transmitting the captured local time to the time synchronization controller in the PPS interrupt response when the PPS signal is received; and passing the local time through a finite impulse response (FIR) low-pass filter to obtain the local time after low-pass filtering and storing the local time after low-pass filtering whenever the time synchronization controller receives the local time.

In one embodiment, the reading a last local time stored before the current local time and reading the stored latest UTC time as a UTC time corresponding to the last local time when the time synchronization controller receives the current local time includes: waiting, by the time synchronization controller, to receive the local time; reading whether the last local time has been stored before the current local time when the time synchronization controller receives the current local time; if not, returning, by the time synchronization controller, to the step of waiting to receive the local time; if yes, reading, by the time synchronization controller, whether the latest UTC time has been stored; if the time synchronization controller has not stored the latest UTC time, deleting, by the time synchronization controller, the last local time, and returning to the waiting to receive the local time; if the time synchronization controller has stored the latest UTC time, reading the stored latest UTC time as the UTC time corresponding to the last local time. The method further includes: deleting the last local time after the time synchronization controller determines the local time correction amount according to the last local time and the latest UTC time.

In one embodiment, the determining, by the time synchronization controller, a local time correction amount according to the last local time and the UTC time corresponding to the last local time includes: passing, by the time synchronization controller, the last local time and the UTC time corresponding to the last local time through a proportional-integral (PI) controller to obtain the local time correction amount.

In a second aspect, the disclosure provides a device for global navigation satellite system time synchronization, including:
  a data packet of NMEA protocol receiving module, configured to receive a data packet of NMEA protocol, read a valid UTC time from the data packet of NMEA protocol, and store the read valid UTC time in a time synchronization controller;
  a PPS signal receiving module, configured to receive a PPS signal, capture a local time output by a local clock at a time when the PPS signal is generated, and store the local time in the time synchronization controller;
  a time matching module, configured to, when the time synchronization controller receives the current local time, read a last local time stored before the current local time and read the stored latest UTC time as a UTC time corresponding to the last local time; and
  a local clock synchronization module, configured to determine, by the time synchronization controller, a local time correction amount according to the last local time and the UTC time corresponding to the last local time, and correct the local clock according to the local time correction amount.

In a third aspect, the disclosure provides a computer device, including a memory and a processor. The memory stores a computer program, and when the processor executes the computer program, the processor implements the following steps:
  receiving a data packet of NMEA protocol, reading a valid UTC time from the data packet of NMEA protocol, and storing the read valid UTC time in a time synchronization controller;
  receiving a PPS signal, capturing a local time output by a local clock at a time when the PPS signal is generated, and storing the local time in the time synchronization controller;
  reading a last local time stored before the current local time and reading the stored latest UTC time as a UTC time corresponding to the last local time when the time synchronization controller receives the current local time; and
  determining, by the time synchronization controller, a local time correction amount according to the last local time and the UTC time corresponding to the last local time, and correcting the local clock according to the local time correction amount.

In a fourth aspect, the disclosure provides a computer readable storage medium, having stored thereon a computer program. When the computer program is executed by a processor, the computer program implements the following steps:
  receiving a data packet of NMEA protocol, reading a valid UTC time from the data packet of NMEA protocol, and storing the read valid UTC time in a time synchronization controller;

receiving a PPS signal, capturing a local time output by a local clock at a time when the PPS signal is generated, and storing the local time in the time synchronization controller;

reading a last local time stored before the current local time and reading the stored latest UTC time as a UTC time corresponding to the last local time when the time synchronization controller receives the current local time; and determining, by the time synchronization controller, a local time correction amount according to the last local time and the UTC time corresponding to the last local time, and correcting the local clock according to the local time correction amount.

For the above method, device, computer equipment and storage medium for GNSS time synchronization, when the time synchronization controller receives the current local time, the last local time stored before the current local time is read and the stored latest UTC time as the UTC time corresponding to the last local time is read. Since the lag correction method of using the local time captured by the last PPS signal to perform time correction only when the local time captured by the current PPS signal is received, and according to the characteristics that the data packet of NMEA protocol at the UTC time corresponding to the output time of the PPS signal must be output after the generation of the PPS signal, the latest UTC time is taken as the UTC time corresponding to the local time captured by the last PPS signal. When the time deviation can also be corrected, the time update point can be fixed, which can validly avoid the failure of parsing of the data packet of NMEA, or the situation that when the system task scheduling is not parsed before the next PPS, the local time captured by the current PPS signal is directly used to correspond to the UTC time, which may correspond to the wrong UTC time. Thus, the local time captured by the PPS signal can be accurately corresponding to the UTC time in the data packet of NMEA protocol corresponding to the PPS signal, so as to validly improve the accuracy of time synchronization.

DETAILED DESCRIPTION OF THE EMBODIMENTS

In order to make the purpose, technical scheme and advantages of the disclosure clearer, the disclosure is further described in detail below in combination with the accompanying drawings and embodiments. It should be understood that the specific embodiments described herein are only used to explain the application and are not used to limit the disclosure.

Figure 1:
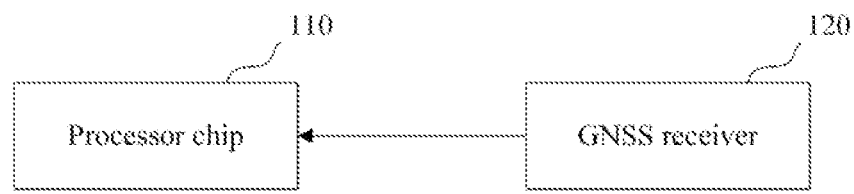
FIG. 1 is the application environment diagram of the method for GNSS time synchronization in one embodiment.

The method for GNSS time synchronization provided in the present disclosure can be applied to the application environment shown in FIG. 1. The processor chip 110 is connected to a GNSS receiver 120, and the processor chip 110 receives the data packet of NMEA protocol and the PPS from the GNSS receiver 120, and executes the method for GNSS time synchronization according to any embodiment of the present disclosure to perform time synchronization on the processor chip 110. The processor chip 110 may be, for example, a system on chip (SOC), which may be loaded in a device such as a vehicle. The SOC has a PPS time capturing function, and when the SOC detects a PPS signal at its PPS pin, the SOC can automatically and quickly capture a current local time and store the current local time at a rising edge or a falling edge time of the PPS signal.

In various embodiments of the present disclosure, the output of the GNSS receiver 120 has two basic characteristics: characteristic 1: only when the GNSS is validly positioned, a PPS signal is output; otherwise, only a data packet of NMEA protocol is output without inputting a PPS signal; Characteristics 2: the data packet of NMEA protocol at the UTC time corresponding to the output time of the PPS signal must be output after the generation of the PPS signal.

Figure 2:
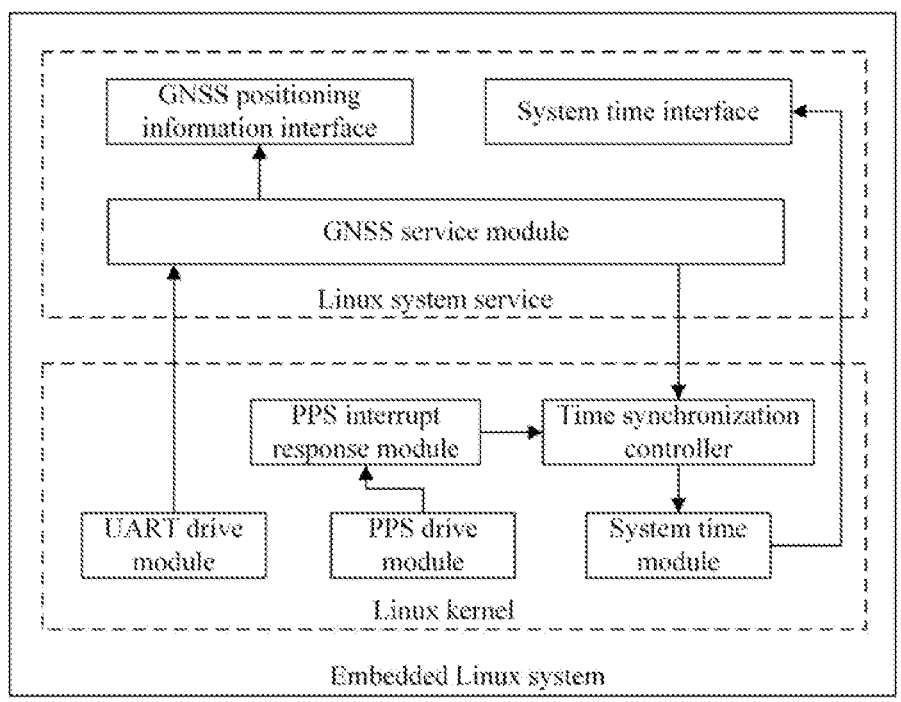
FIG. 2 is the software system architecture diagram of the embedded Linux system based on the system on chip (SOC) in one embodiment.

In one embodiment, taking the processor chip 110 as a SOC as an example, the method for GNSS time synchronization provided by the embodiment of the present disclosure may be applicable to an embedded Linux system operating on the above SOC 110. For example, the embedded Linux system may have the software system architecture as shown in FIG. 2.

The embedded Linux system may include a Linux system service layer and a Linux kernel layer. In the Linux system service layer, a GNSS service module, a GNSS positioning information interface and a system time interface are included. In the Linux kernel layer, modules such as a universal asynchronous receiver/transmitter (UART) drive module, a PPS drive module, a PPS interrupt response module, a time synchronization controller and a system calendar time module are included, and these modules respectively have the following functions:

UART drive module: configured to receive the data packet of NMEA protocol output by the GNSS receiver. The GNSS receiver may output data packets of the NMEA-0183 protocol through the serial interface, for example, data packets in the format of GPGGA, GPZDA and GPRMC. In the method described in the present disclosure, it is required to configure the GNSS receiver to be capable of outputting the data packet of NMEA protocol with information about year, month, day, hour, minute and second;

PPS drive module: configured to configure the PPS time capturing function of the SOC, and after the configuration is completed, quickly capture and store the local time output by the current local clock at the time of generation of the PPS signal (according to the PPS signal, the time of generation of the PPS signal may be a rising edge or a falling edge):

PPS interrupt response module: configured to enter the PPS interrupt response when a PPS signal is captured, and transmit the local time captured by the PPS drive module to the time synchronization controller in the PPS interrupt response;

Time synchronization controller; configured to correct the local time of the local clock by using the local time captured at the time of generating the PPS signal and the UTC time corresponding to the local time obtained by parsing the received NMEA-0183 protocol data packet.

Local time module: configured to provide calendar time of the Linux kernels.

GNSS service module: configured to call the UART driver interface provided by the Linux kernels, receive the data packet of NMEA protocol output by GNSS receivers, and parse the data packet of NMEA protocol to obtain the positioning information and UTC time. After the parsing and verification are completed, the GNSS service module provides a GNSS positioning information interface to the application program, and meanwhile transmits the UTC time to the time synchronization controller of the Linux kernels through the clock_settime interface.

The advantage of placing the parsing work of the data packet of NMEA protocol in the GNSS service module is that: the GNSS service module can not only complete the parsing of the data packet of NMEA protocol, and it is also more convenient for the application program to configure the GNSS receiver and transmit RTCM data according to a receiver signal and actual needs. It is easier to implement upper and lower layer decoupling of the system. In addition, the real-time requirement for parsing the data packet of NMEA protocol is not high, and the GNSS service module receives system task scheduling management in a user state, thereby avoiding influencing other task execution due to resource occupied by parsing work.

It can be understood that the division of each module in the software system architecture shown in FIG. 2 is merely an example, and in other examples, the division of each software module may be flexibly added or changed, so that the method of the present disclosure is executed in different software system architectures, as long as the software system architecture can implement the method for GNSS time synchronization of the embodiments of the present disclosure.

Figure 3:
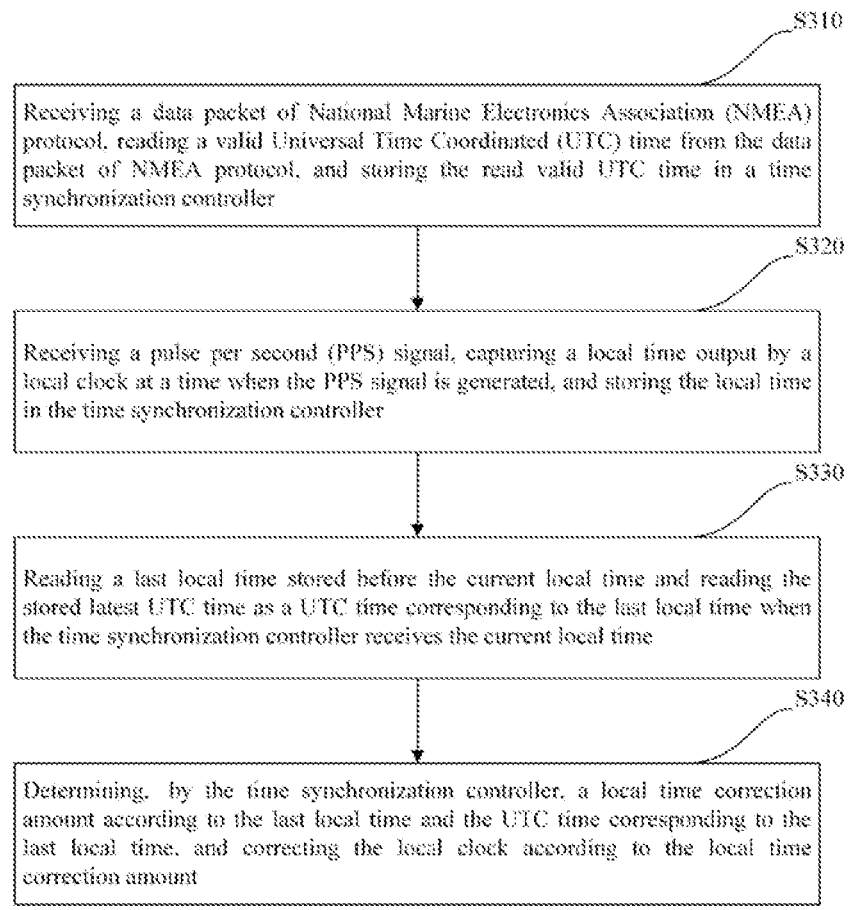
FIG. 3 is the flowchart of the method for GNSS time synchronization in one embodiment.

In one embodiment, as shown in FIG. 3, a method for GNSS time synchronization is provided. Taking the application of the method to the processor chip in FIG. 1 as an example, it includes the following steps:

Step S310, receiving a data packet of NMEA protocol, reading a valid UTC time from the data packet of NMEA protocol, and storing the read valid UTC time in a time synchronization controller;

in this step, the data packet of NMEA protocol may be received by the processor chip from the GNSS receiver.

The NMEA protocol is the Radio Technical Commission for Maritime services (RTCM) standard protocol for the GNSS receiver outputting satellite positioning results. The data packet of NMEA protocol includes information such as UTC time, latitude and longitude, satellite ephemeris, speed, and positioning state. The GNSS receiver is generally configured to output the data packet of NMEA protocol at predetermined time intervals (e.g., every 1 s).

The valid UTC time refers to a UTC time satisfying a predetermined requirement. The predetermined requirement may include, for example, the UTC time being the UTC time included in the data packet of NMEA protocol output when the GNSS is validly positioned, and/or, the UTC time is a UTC time obtained by completing the parsing of the data packet of NMEA protocol within a predetermined time period.

Step S320, receiving a PPS signal, capturing a local time output by a local clock at a time when the PPS signal is generated, and storing the local time in the time synchronization controller;

in this step, the data packet of NMEA protocol is received by the processor chip from the GNSS receiver.

The output data packet of NMEA protocol includes the result of the positioning solution. Meanwhile, data transmission of a communication port (such as a serial interface) also takes time. The processor chip receiving and then parsing the data packet of NMEA protocol also take time. Therefore, a high-precision PPS signal output at the moment of the integral second is also needed. The PPS signal is used to notify the processor chip that the current moment is an integral second moment. Then, the processor chip receives the data of NMEA protocol to obtain an actual UTC time corresponding to the integral second moment.

The PPS signal is a PPS signal output at the moment of the integral second, and after the receiver is validly positioned, the receiver outputs the PPS signal to strictly align the integral second of the UTC time of the satellite, thus having a high accuracy of timing (nanosecond level accuracy).

The local clock is the time recorded by the processor chip itself, and taking the processor chip as a SOC as an example, the local clock thereof may be a system clock of an embedded system running on a general processor inside the SOC, and the local time output by the local clock is the system time of the system clock.

Step S330, reading a last local time stored before the current local time and reading the stored latest UTC time as a UTC time corresponding to the last local time when the time synchronization controller receives the current local time;

each time the time synchronization controller receives a local time, the time synchronization controller may store the received local time in the time synchronization controller according to the received sequence of the local time, and each time the time synchronization controller receives a UTC time, the time synchronization controller may determine a latest UTC time in the stored UTC times. The time synchronization controller may determine the time of the latest UTC time in different ways, for example, it may store only one latest UTC time, or it may store multiple UTC times, but according to the size of the UTC time, it may still determine one UTC time with the maximum time value as the latest UTC time.

Step S340, determining, by the time synchronization controller, a local time correction amount according to the last local time and the UTC time corresponding to the last local time, and correcting the local clock according to the local time correction amount.

In this step, the time synchronization controller determines the local time correction amount according to the last local time and the UTC time corresponding to the last local time, and corrects the local clock according to the local time correction amount, so as to complete time synchronization of the local clock.

In the above method for GNSS time synchronization, when the time synchronization controller receives the current local time, the last local time stored before the current local time is read and the stored latest UTC time as the UTC time corresponding to the last local time is read. Since the lag correction method of using the local time captured by the last PPS signal to perform time correction only when the local time captured by the current PPS signal is received, and according to the characteristics that the data packet of NMEA protocol at the UTC time corresponding to the output time of the PPS signal must be output after the generation of the PPS signal, the latest UTC time is taken as the UTC time corresponding to the local time captured by the last PPS signal, and the time update point can be fixed, which can validly avoid the failure of parsing of the data packet of NMEA, or the situation that when the system task scheduling is not resolved before the next PPS, the local time captured by the current PPS signal is directly used to correspond to the UTC time, which may correspond to the wrong UTC time. Thus, the local time captured by the PPS signal can be accurately corresponding to the UTC time in the data packet of NMEA protocol corresponding to the PPS signal, so as to validly improve the accuracy of time synchronization.

In one embodiment, in step S310, the receiving a data packet of NMEA protocol, reading a valid UTC time from the data packet of NMEA protocol, and storing the read valid UTC time in a time synchronization controller includes:

Step S311, waiting for the data packet of NMEA protocol;

Step S312, parsing the data packet of NMEA protocol to obtain a current positioning state and a current UTC time whenever the data packet of NMEA protocol is received; and judging whether the current positioning state is a valid positioning state;

the valid positioning state may include, for example, a single-point three-dimensional (3D) positioning, a real-time kinematic (RTK) fixed solution, a real-time dynamic floating solution, and the like. The data of NMEA protocol includes information about a satellite positioning state. For example, the second field of the GPRMC in the NMEA protocol indicates a positioning state, where A is a valid positioning, and V is an invalid positioning.

Step S313, when the current positioning state is not a valid positioning state, returning to the waiting for the data packet of NMEA protocol;

Step S314, when the current positioning state is a valid positioning state, determining the current UTC time is the valid UTC time, transmitting the current valid UTC time into the time synchronization controller, and then returning to the waiting for the data packet of NMEA protocol;

Step S315, storing the UTC time with a maximum time value as the latest UTC time whenever the time synchronization controller receives a UTC time.

In the present embodiment, according to the characteristic of the output of the GNSS receiver that the PPS signal will be output only when the GNSS validly positions, only when the GNSS validly positions, that is, when the positioning state in the data packet of NMEA protocol is a valid positioning, then will the UTC time in the data packet of NMEA protocol be transmitted to the time synchronization controller to avoid the situation that the time synchronization controller fails to receive the local time corresponding to the PPS signal but receives the corresponding UTC time, resulting in the difficulty of the time synchronization controller to correspond the UTC time to the correct local time. It effectively improves the accuracy of the time synchronization performed by the time synchronization controller.

When parsing the data packet of NMEA protocol, if the parsing time is too long, the obtained UTC time is poor in real time, and if the UTC time is used to execute the correction on the local clock, the accuracy of time synchronization will be reduced. Therefore, it can be considered that if the time taken for parsing the data packet of NMEA protocol exceeds a predetermined time threshold, for example, the time interval of the output of the GNSS (namely, the case where the next data packet of NMEA protocol has encountered but the parsing of the current data packet of NMEA protocol has not been completed), the local time is corrected without using the UTC time of the data packet of NMEA protocol with the parsing timeout.

In the above step S315, the time synchronization controller stores the UTC time with the maximum time value as the latest UTC time. Thus, even if the UTC time in the timeout data packet of NMEA protocol is parsed and transmitted to the time synchronization controller, the UTC time is also replaced by the next UTC time of the data packet of NMEA protocol arriving subsequently as the latest UTC time to avoid that the UTC time with parsing timeout is used as the latest UTC time.

Further, in order to ensure that the local time is corrected without using the UTC time of the data packet of NMEA protocol with parsing timeout, it is also possible to stop the parsing of the current data packet of NMEA protocol when the parsing of the current data packet of NMEA protocol expires, so as to avoid transmitting the UTC time of the current date packet with parsing timeout to the time synchronization controller. In one embodiment, in step S312, the parsing the data packet of NMEA protocol to obtain a current positioning state and a current UTC time whenever the data packet of NMEA protocol is received includes:

Step S3121, stopping parsing the last data packet of NMEA protocol and parsing a currently received data packet of NMEA protocol to obtain a current positioning state and a current UTC time if the parsing of the last data packet of NMEA protocol is not completed upon receiving the currently received data packet of NMEA protocol whenever the data packet of NMEA protocol is received;

Step S3122, continuing to parse the currently received data packet of NMEA protocol to obtain a current positioning state and a current UTC time if the parsing of the last data packet of NMEA protocol is completed upon receiving the currently received data packet of NMEA protocol whenever the data packet of NMEA protocol is received.

In the present embodiment, if the parsing of the current data packet of NMEA protocol has not been completed and the next data packet of NMEA protocol has encountered, the parsing of the current data packet is abandoned, and the next data packet of NMEA protocol is parsed. Thus, it is avoided to transmit the UTC time of the current data packet with the parsing timeout to the time synchronization controller.

In one embodiment, in step S315, the storing the UTC time with a maximum time value as the latest UTC time whenever the time synchronization controller receives a UTC time includes:

Step S3151, judging, by the time synchronization controller, whether the current time synchronization controller is in a free state or a busy state whenever the time synchronization controller receives a UTC time;

the busy state indicates that the time synchronization controller is using the last local time and the latest UTC time to perform a correction on the local clock; and the free state indicates that the time synchronization controller is not using the last local time and the latest UTC time to perform a correction on the local clock;

whenever the time synchronization controller enters steps S330 and S340, the time synchronization controller may mark its own state as being in a busy state, and may mark its own state back in a free state every time the time synchronization controller completes steps S330 and S340.

Step S3152, storing the UTC time with the maximum time value as the latest UTC time when the time synchronization controller is in the free state.

Step S3153, waiting for the time synchronization controller to switch to the free state and storing the UTC time with the maximum time value as the latest UTC time when the time synchronization controller is in the busy state.

In the present embodiment, when the time synchronization controller receives the UTC time, the time synchronization controller may currently use the UTC time of the last frame to perform time synchronization. In order to avoid possible operation errors caused by the new UTC time overwriting the UTC time being calculated, the time synchronization controller stores and updates the latest UTC time until it is in a free state. Here, in view of the GNSS receiver characteristic 2 described above, if the time synchronization controller is in the busy state, the UTC time corresponding to the last PPS time must be used at this time.

In one embodiment, in step S315, the storing the UTC time with a maximum time value as the latest UTC time whenever the time synchronization controller receives a UTC time includes:

Step S3154, whenever the time synchronization controller receives a UTC time, if there is no stored UTC time, storing the received UTC time as the latest UTC time;

Step S3155, if there is any stored UTC time, overwriting the stored UTC time with the received UTC time as the latest UTC time when the received UTC time is greater than the stored UTC time, and discarding the received UTC time and reserving the stored UTC time as the latest UTC time when the received UTC time is less than the stored UTC time;

The method for GNSS time synchronization further includes:

Step S350, deleting the latest UTC time after the time synchronization controller determines the local time correction amount according to the last local time and the latest UTC time.

In this embodiment, the time synchronization controller stores only one latest UTC time with the maximum time value. When there is a new UTC time, a UTC time with a greater time value will overwrite a UTC time with a smaller time value, and the latest UTC time is deleted after use to avoid resource waste and data interference caused by storing redundant UTC time.

It can be understood that the above two embodiments can be performed in combination, that is, in step S315, the time synchronization controller can wait until it is in the free state, store the UTC time with the maximum time value as the latest UTC time, and only store the latest UTC time with the maximum time value, which will be deleted after use.

In one embodiment, in step S320, the receiving a PPS signal, capturing a local time output by a local clock at a time when the PPS signal is generated, and storing the local time in the time synchronization controller includes:

Step S321, waiting for the PPS signal;

Step S322, capturing the local time output by the local clock at the time when the PPS signal is generated, triggering a PPS interrupt response, and transmitting the captured local time to the time synchronization controller in the PPS interrupt response when the PPS signal is received;

Step S323, passing the local time through a finite impulse response (FIR) low-pass filter to obtain the local time after low-pass filtering and storing the local time after low-pass filtering whenever the lime synchronization controller receives the local time.

In the present embodiment, the noise of the PPS signal and the noise captured by the system time can be smoothed by using the FIR filter, and the phase linearity is maintained.

In one embodiment, in step 330, the reading a last local time stored before the current local time and reading the stored latest UTC time as a UTC time corresponding to the last local time when the time synchronization controller receives the current local time includes:

Step S323, waiting, by the time synchronization controller, to receive the local time;

Step S323, reading whether the last local time has been stored before the current local time when the time synchronization controller receives the current local time;

if the last local time has not been stored before the current local time, executing step S323, and returning, by the time synchronization controller, to the waiting to receive the local time;

if the last local time has been stored before the current local time, executing step S323, and reading, by the time synchronization controller, whether the latest UTC time has been stored;

if the time synchronization controller has not stored the latest UTC time, executing step S323, deleting, by the time synchronization controller, the last local time, and returning to the waiting to receive the local time;

if the time synchronization controller has stored the latest UTC time, executing step S323, reading the stored latest UTC time as the UTC time corresponding to the last local time;

the method for GNSS time synchronization further includes:

Step S360, deleting the last local time after the time synchronization controller determines the local time correction amount according to the last local time and the latest UTC time.

In the foregoing embodiments of the present disclosure, it is considered that when the time taken for parsing the data packet of NMEA protocol exceeds the time interval of GNSS output, the local time is corrected without using the UTC time of the data packet of NMEA protocol with parsing timeout. However, the PPS signal corresponding to the data packet of NMEA protocol with parsing timeout can still be received and the local time when the PPS signal is generated can also be captured. In order to avoid mistakenly corresponding the local time captured by the PPS signal corresponding to the data packet of NMEA protocol with parsing timeout to other UTC times, in the embodiments, if it is determined in step S323 that the time synchronization controller has not stored the latest UTC time, then, it indicates that after the last PPS is generated, the UTC time that is parsed by the system may not be received in time because the parsing fails or the parsing delay. Then, in step S323, the time synchronization controller deletes the last local time and returns to the waiting to receive the local time. In this way, it is effectively avoided to use the last local time captured by the PPS signal corresponding to the data packet of NMEA protocol with parsing timeout in time synchronization to further improve the accuracy of time synchronization.

In one embodiment, in step S350, the determining, by the time synchronization controller, a local time correction amount according to the last local time and the UTC time corresponding to the last local time includes: passing, by the time synchronization controller, the last local time and the UTC time corresponding to the last local time through a proportional-integral (PI) controller to obtain the local time correction amount.

In this embodiment, the local time correction amount is obtained bypassing the last local time and the UTC time corresponding to the last local time through the PI controller, and the local time is corrected by using the local time correction amount, so as to avoid the time jump possibly caused by directly using the UTC time to correcting the local time, thereby effectively improving the accuracy and smoothness of the time correction.

In one embodiment, the passing, by the time synchronization controller, the last local time and the UTC time corresponding to the last local time through a PI controller to obtain the local time correction amount includes: passing, by the time synchronization controller, a last local time and a UTC time corresponding to the last local time through the PI controller to subtract the last local time from the UTC time corresponding to the last to obtain a time difference value; passing the time difference value respectively through a proportional loop and an integral loop; adding the output value obtained by the proportional loop to the output value obtained by the integration loop to obtain the local time correction amount.

Where, the PI controller includes the proportional loop (P) and the integral loop (I). The proportional loop is configured for adjustment to make the input object response quickly, and the integral loop is configured for adjustment to make the input object reaches degree of the ideal result. The processing performed by the time synchronization controller can be shown in FIG. 4.

In order to make the technical solutions of the method for GNSS time synchronization according to the above embodiments of the present disclosure clearer and more clearly understandable, a specific application example is listed below, and in the present application example, the steps of the method for GNSS time synchronization according to the above embodiments are combined. Taking that the method is applied to the embedded Linux system as shown in FIG. 2 as an example, correspondingly, the local clock is a system clock of the embedded Linux system, and the local time is a system time of the embedded Linux system, and the processing flow of the method for GNSS time synchronization in the present application example can be seen in FIG. 5.

The method for GNSS time synchronization in this application example may be divided into two parts of the NMEA response process and the PPS response process, which are executed respectively in parallel on two threads.

In the thread I, the flow of the NMEA response process includes the following steps:

Step S501, turning on the Linux operating system power to start the GNSS service module, or starting, by the application software of the user, the GNSS service module; configuring, by the GNSS service module, the parameters of ports for reading data, and configuring parameters of the GNSS receiver outputting a data packet of NMEA protocol to make the data packet of NMEA protocol include the UTC time information; wherein the GNSS receiver may also be configured to output a combination of multiple data packets of NMEA protocol;

Step S502, waiting, by the GNSS service module, for a data packet of NMEA protocol;

Step S503, after the GNSS service module receives the data packet of NMEA protocol, parsing the data packet of NMEA protocol according to the NMEA-0183 protocol to obtain a positioning state and a UTC time $T_{UTC}(i)$ at the current i-th moment, wherein parsing the data packet of NMEA protocol should be controlled within a time interval of PPS output, namely, within 1 s; if exceeding 1 s, stopping the parsing of the data packet of NMEA protocol and discarding the data packet of NMEA protocol;

Step S504, determining, by the GNSS service module, whether the current positioning state is a valid positioning state, and if not, returning to the step S502, and continuing to wait for the data packet of NMEA protocol; and if yes, proceeding to the step S505.

Step S505, calling, by the GNSS service module, the clock_settime system call function to input two parameters of the CLOCK_REALTIME and the UTC time $T_{UTC}(i)$ to the time synchronization controller; wherein the CLOCK_REALTIME is an incoming parameter of clock_settime, and is used to indicate that the input time is a system real-time clock; and after the parameter inputting succeeds, returning to the step S502;

Step S506, waiting, by the time synchronization controller, until it is in a free state;

wherein, specifically, the time synchronization controller determines whether the current time synchronization controller is in a free state or a busy state. If it is in the free state, the process proceeds to the step S507 directly, and if it is in the busy state, the process proceeds to the step S507 after waiting until it is in the free state.

wherein, in view of the GNSS receiver characteristic 2 described above, if the time synchronization controller is in the busy state, the UTC time $T_{UTC}(i-1)$ corresponding to the last PPS time must be used at this time.

Step S507, updating, by the time synchronization controller, the stored latest UTC time;

wherein, the time synchronization controller stores and updates the latest TC time $T_{UTC}$ with the UTC time $T_{UTC}(i)$ only when it is in the free state. The time synchronization controller stores only one latest UTC time $T_{UTC}$, and the used latest UTC time $T_{UTC}$ is deleted after the stored latest UTC time $T_{UTC}$ is used for time synchronization.

In the thread II, the PPS response flow includes the following steps:

Step S511, configuring, by the GNSS service module, the PPS output parameters of the GNSS receiver, including configuring to enable the PPS of the SOC to automatically capturing system time, the PPS interruption response and the PPS response mode (rising edge or falling edge);

Step S512, waiting, by the PPS drive module, for a PPS signal;

Step S513, when the PPS drive module receives the PPS signal, capturing the system time $T_{sys}(i)$ output by the system clock at the time when the PPS signal is generated, triggering the PPS interrupt response module into the PPS interrupt response; in the PPS interrupt response, obtaining, by the PPS interrupt response module, the captured system time $T_{sys}(i)$ from the PPS drive module, and transmitting the captured system time $T_{sys}(i)$ to the time synchronization controller;

Step S514, passing, by the time synchronization controller, the received system time $T_{sys}(i)$ through a FIR low-pass filter to obtain the system time $T_{sys}(i)$ after low-pass filtering;

Step S515, storing, by the time synchronization controller, the system time $T_{sys}(i)$ after low-pass filtering into the system time sequence according to the receiving time sequence;

Step S516, judging, by the time synchronization controller, whether the currently received system time $T_{sys}(i)$ is the first data (namely, the data received earliest) in the system time sequence, that is, reading whether any last system time has been stored before the current system time; if it is the first data and it indicates that the last system time is not stored before the current system time, then returning to the step S512, and continuing to wait for the next PPS signal, and if it is not the first data and it indicates that the last system time is already stored before the current system time, proceeding to step S517;

Step S517, transitioning, by the time synchronization controller, its own state from the free state to the busy state, and checking, by the time synchronization controller, whether the latest UTC time is stored currently; wherein, in view of the characteristics 1 and 2 of the GNSS receiver, the latest UTC time $T_{UTC}$ viewed at this time must necessarily be the UTC time $T_{UTC}(i-1)$ corresponding to the last system time $T_{sys}(i-1)$ captured at the last PPS time; if there is no stored $T_{UTC}(i-1)$, which indicates that after the last PPS is generated, due to the timeout or failure of parsing the data packet of NMEA protocol, the time synchronization controller does not receive the parsed UTC time in time, thus, deleting the stored last system time from the system time sequence, and returning to step S512; if there is a stored $T_{UTC}(i-1)$, proceeding to step S518;

Step S518, passing, by the time synchronization controller, the last system time $T_{sys}(i-1)$ and the UTC time $T_{UTC}(i-1)$ corresponding to the last system time through the PI controller to obtain the system time correction amount;

Step S519, adjusting, by the time synchronization controller, the system time of the system clock according to the system time correction amount to complete time synchronization of the system clock; after the time synchronization is completed, deleting, by the time synchronization controller, the stored UTC time $T_{UTC}(i-1)$ and the system time $T_{sys}(i-1)$ stored in the system time sequence, transitioning its own state from the busy state to the free state, and then returning to step S512.

Figure 4:
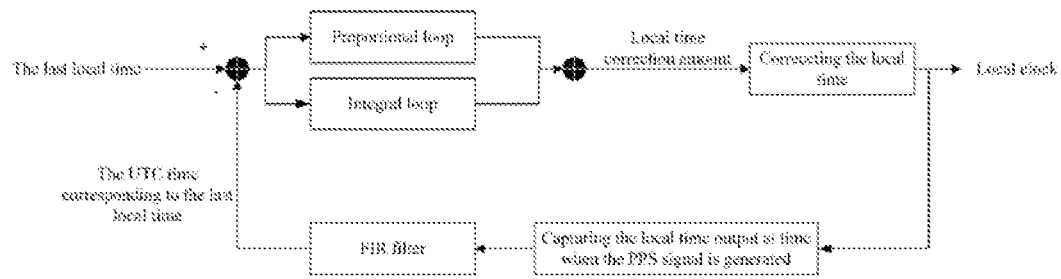
FIG. 4 is the flowchart of the processing of the time synchronization controller in one embodiment.
Figure 5:
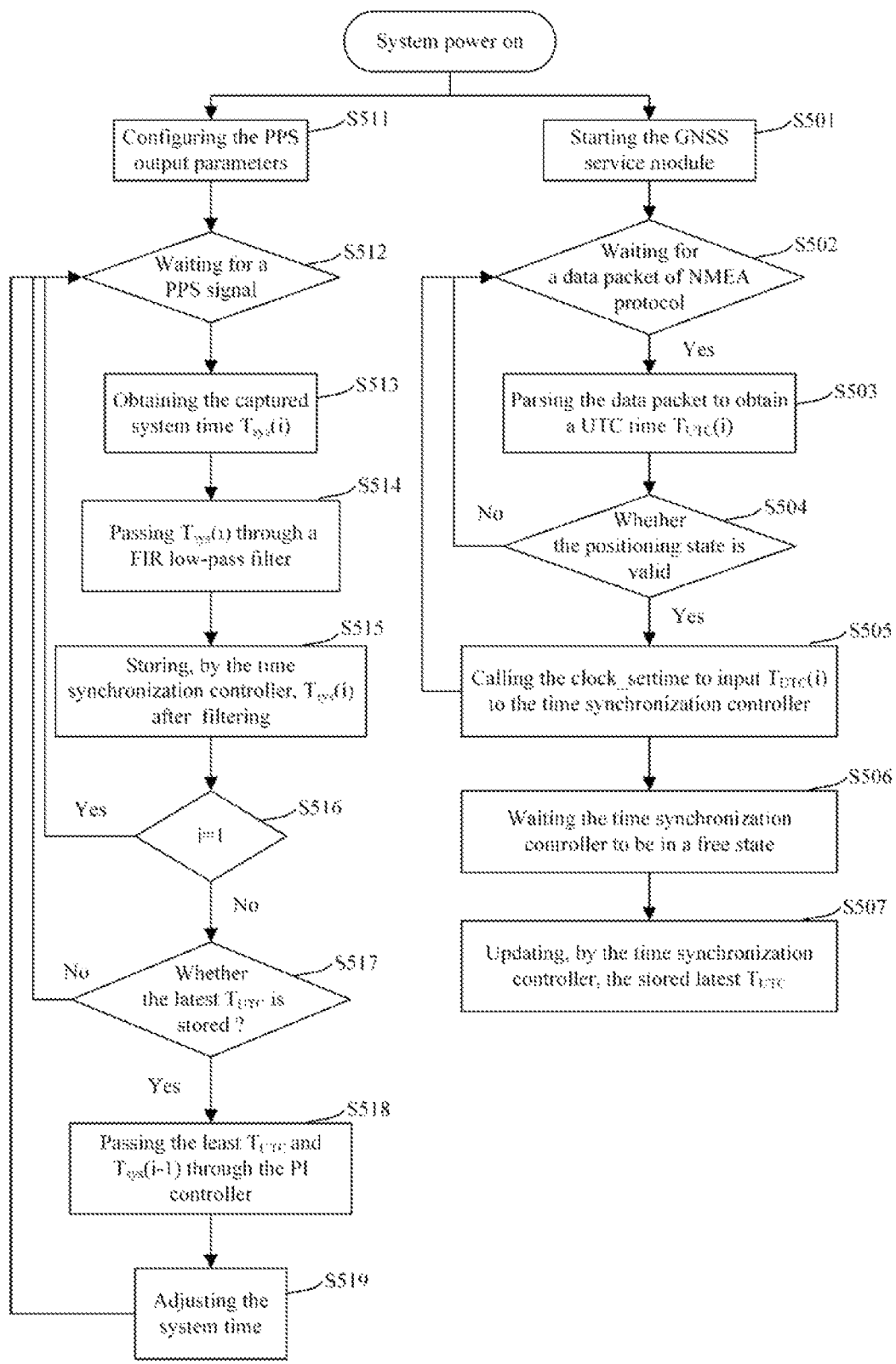
FIG. 5 is the flowchart of the method for GNSS time synchronization in one embodiment.

It should be understood that, although the various steps in the flowcharts of FIGS. 3-5 are displayed in sequence as indicated by arrows, these steps are not necessarily performed in sequence as indicated by arrows. The execution of these steps is not limited in strict order unless expressly described herein, and these steps may be performed in other order. Furthermore, at least a part of the steps in FIGS. 3-5 may include multiple sub-steps or multiple stages. These sub-steps or stages are not necessarily performed at the same time. Instead, the execution may be performed at different moments, and the execution order of these sub-steps or stages is not necessarily performed in sequence. Instead, it may be performed alternately with other steps or at least part of sub-steps or stages of other steps.

Figure 6:
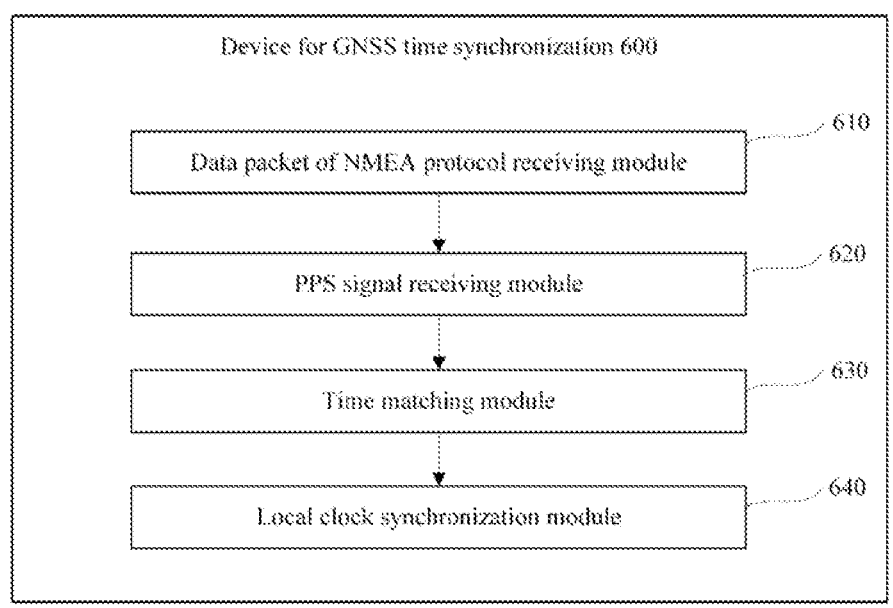
FIG. 6 is the structural block diagram of the device for GNSS time synchronization in one embodiment.

In one embodiment, as shown in FIG. 6, a device for GNSS time synchronization 600 is provided, including:
- a data packet of NMEA protocol receiving module 610, configured to receive a data packet of NMEA protocol, read a valid UTC time from the data packet of NMEA protocol, and store the read valid UTC time in a time synchronization controller;
- a PPS signal receiving module 620, configured to receive a PPS signal, capture a local time output by a local clock at a time when the PPS signal is generated, and store the local time in the time synchronization controller;
- a time matching module 630, configured to, when the time synchronization controller receives the current local time, read a last local time stored before the current local time and read the stored latest UTC time as a UTC time corresponding to the last local time; and
- a local clock synchronization module 640, configured to determine, by the time synchronization controller, a local time correction amount according to the last local time and the UTC time corresponding to the last local time, and correct the local clock according to the local time correction amount.

For the specific definition of GNSS time synchronization device 600, the above definition of GNSS time synchronization method may be referred to, which will not be repeated here. Each module in the GNSS time synchronization device 600 can be implemented in whole or in part by software, hardware and their combinations. The above modules can be embedded in or independent of the processor in the computer device in the form of hardware, or stored in the memory in the computer device in the form of software, so as to facilitate the processor to call and execute the corresponding operations of the above modules.

In one embodiment, a computer device is provided. The computer device includes a memory and a processor, the memory stores a computer program, and when the processor executes the computer program, the processor implements the following steps:
- receiving a data packet of NMEA protocol, reading a valid UTC time from the data packet of NMEA protocol, and storing the read valid UTC time in a time synchronization controller;
- receiving a PPS signal, capturing a local time output by a local clock at a time when the PPS signal is generated, and storing the local time in the time synchronization controller;
- reading a last local time stored before the current local time and reading the stored latest UTC time as a UTC time corresponding to the last local time when the time synchronization controller receives the current local time; and
- determining, by the time synchronization controller, a local time correction amount according to the last local time and the UTC time corresponding to the last local time, and correcting the local clock according to the local time correction amount.

Wherein, the computer device may be, for example, a SOC.

In other embodiments, the processor also implements the method for GNSS time synchronization of any of the above embodiments when executing the computer program, and has corresponding beneficial effects.

In one embodiment, a computer readable storage medium is provided, having stored thereon a computer program. When the computer program is executed by a processor, the computer program implements the following steps:
- receiving a data packet of NMEA protocol, reading a valid UTC time from the data packet of NMEA protocol, and storing the read valid UTC time in a time synchronization controller;
- receiving a PPS signal, capturing a local time output by a local clock at a time when the PPS signal is generated, and storing the local time in the time synchronization controller;
- reading a last local time stored before the current local time and reading the stored latest UTC time as a UTC time corresponding to the last local time when the time synchronization controller receives the current local time; and
- determining, by the time synchronization controller, a local time correction amount according to the last local time and the UTC time corresponding to the last local time, and correcting the local clock according to the local time correction amount.

In other embodiments, the computer program also implements the method for GNSS time synchronization of any of the above embodiments when executed by the processor, and has corresponding beneficial effects.

A person of ordinary skill in the art may understand that all or part of the processes of the method in the foregoing embodiments may be implemented by a computer program instructing relevant hardware. The computer program may be stored in a non-volatile computer readable storage medium. When the computer program is executed, the computer program may include the processes of the foregoing method embodiments. Any reference to memory, storage, database or other media used in the embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. The volatile memory may include a random access memory (RAM) or an external cache. By way of illustration and not limitation, RAM is available in a variety of forms, such as static RAM (SRAM), dynamic RAM (DRAM), synchronous DRAM (SDRAM), dual data rate SDRAM (DDRS-DRAM), enhanced SDRAM (ESDRAM), synchronous loop (Synchloop) DRAM (SLDRAM), memory bus (Rambus) direct RAM (RDRAM), direct memory bus dynamic RAM (DRDRAM), and memory bus dynamic RAM (RDRAM), etc.

The respective technical features of the above embodiments can be combined arbitrarily, and in order to brief the description, all possible combinations of the respective technical features in the above embodiments are not described; however, as long as the combination of these technical features does not have any contradiction, it should be considered to be the scope of disclosure disclosed in the present description.

The above embodiments merely express several embodiments of the present disclosure, and the description thereof is more specific and detailed, but cannot be construed as limiting the scope of the present invention. It should be noted that, for a person of ordinary skill in the art, several modifications and improvements can also be made without departing from the concept of the present disclosure, which all belong to the scope of protection of the present disclosure. Therefore, the scope of protection of the present disclosure should be regarded by the appended claims.

What is claimed is:

1. A method for global navigation satellite system time synchronization, comprising:
   receiving a data packet of National Marine Electronics Association (NMEA) protocol, reading a valid Universal Time Coordinated (UTC) time from the data packet of NMEA protocol, and storing the read valid UTC time in a time synchronization controller;
   receiving a pulse per second (PPS) signal, capturing a local time output by a local clock at a time when the PPS signal is generated, and storing the local time in the time synchronization controller;
   reading a last local time stored before the current local time and reading the stored latest UTC time as a UTC time corresponding to the last local time when the time synchronization controller receives the current local time; and
   determining, by the time synchronization controller, a local time correction amount according to the last local time and the UTC time corresponding to the last local time, and correcting the local clock according to the local time correction amount.

2. The method of claim 1, wherein the step of receiving a data packet of NMEA protocol, reading a valid UTC time from the data packet of NMEA protocol, and storing the read valid UTC time in a time synchronization controller comprises:
   waiting for the data packet of NMEA protocol;
   parsing the data packet of NMEA protocol to obtain a current positioning state and a current UTC time whenever the data packet of NMEA protocol is received; and judging whether the current positioning state is a valid positioning state;
   returning to the waiting for the data packet of NMEA protocol when the current positioning state is not a valid positioning state;
   determining the current UTC time is the valid UTC time, transmitting the current valid UTC time into the time synchronization controller, and then returning to the step of the waiting for the data packet of NMEA protocol when the current positioning state is a valid positioning state; and
   storing the UTC time with a maximum time value as the latest UTC time whenever the time synchronization controller receives a UTC time.

3. The method of claim 2, wherein the step of parsing the data packet of NMEA protocol to obtain a current positioning state and a current UTC time whenever the data packet of NMEA protocol is received comprises:
   whenever a data packet of NMEA protocol is received, if the parsing of the last data packet of NMEA protocol is not completed upon receiving a currently received data packet of NMEA protocol, stopping parsing the last data packet of NMEA protocol and parsing the currently received data packet of NMEA protocol to obtain the current positioning state and the current UTC time; and
   if the parsing of the last data packet of NMEA protocol is completed upon receiving a currently received data packet of NMEA protocol, continuing to parse the currently received data packet of NMEA protocol to obtain the current positioning state and the current UTC time.

4. The method of claim 2, wherein the storing the UTC time with a maximum time value as the latest UTC time whenever the time synchronization controller receives a UTC time comprises:
   judging, by the time synchronization controller, whether the current time synchronization controller is in a free state or a busy state whenever the time synchronization controller receives a UTC time; wherein the busy state indicates that the time synchronization controller is using the last local time and the latest UTC time to perform a correction on the local clock;
   storing the UTC time with the maximum time value as the latest UTC time when the time synchronization controller is in the free state; and
   waiting for the time synchronization controller to switch to the free state and storing the UTC time with the maximum time value as the latest UTC time when the time synchronization controller is in the busy state.

5. The method of claim 2, wherein the step of storing the UTC time with a maximum time value as the latest UTC time whenever the time synchronization controller receives a UTC time comprises:
   whenever the time synchronization controller receives a UTC time, if there is no stored UTC time, storing the received UTC time as the latest UTC time;
   if there is any stored UTC time, overwriting the stored UTC time with the received UTC time as the latest UTC time when the received UTC time is greater than the stored UTC time, and discarding the received UTC time and reserving the stored UTC time as the latest UTC time when the received UTC time is less than the stored UTC time;

wherein the method further comprises:
deleting the latest UTC time after the time synchronization controller determines the local time correction amount according to the last local time and the latest UTC time.

6. The method of claim 1, wherein the step of receiving a PPS signal, capturing a local time output by a local clock at a time when the PPS signal is generated, and storing the local time in the time synchronization controller comprises:
waiting for the PPS signal;
capturing the local time output by the local clock at the time when the PPS signal is generated, triggering a PPS interrupt response, and transmitting the captured local time to the time synchronization controller in the PPS interrupt response when the PPS signal is received; and
passing the local time through a finite impulse response (FIR) low-pass filter to obtain the local time after low-pass filtering and storing the local time after low-pass filtering whenever the time synchronization controller receives the local time.

7. The method of claim 1, wherein the step of reading a last local time stored before the current local time and reading the stored latest UTC time as a UTC time corresponding to the last local time when the time synchronization controller receives the current local time comprises:
waiting, by the time synchronization controller, to receive the local time;
reading whether the last local time has been stored before the current local time when the time synchronization controller receives the current local time;
if not, returning, by the time synchronization controller, to the step of waiting to receive the local time;
if yes, reading, by the time synchronization controller, whether the latest UTC time has been stored;
if the time synchronization controller has not stored the latest UTC time, deleting, by the time synchronization controller, the last local time, and returning to the waiting to receive the local time;
if the time synchronization controller has stored the latest UTC time, reading the stored latest UTC time as the UTC time corresponding to the last local time;

wherein the method further comprises:
deleting the last local time after the time synchronization controller determines the local time correction amount according to the last local time and the latest UTC time.

8. The method of claim 1, wherein the step of determining, by the time synchronization controller, a local time correction amount according to the last local time and the UTC time corresponding to the last local time comprises:
passing, by the time synchronization controller, the last local time and the UTC time corresponding to the last local time through a proportional-integral (PI) controller to obtain the local time correction amount.

9. A computer device, comprising a memory and a processor, wherein the memory stores a computer program, and the processor implements the steps of the method for global navigation satellite system time synchronization of claim 1 when the processor executes the computer program.

10. A computer readable storage medium, having stored thereon a computer program, wherein the computer program implements the steps of the method for global navigation satellite system time synchronization of claim 1 when the computer program is executed by a processor.

11. A device for global navigation satellite system time synchronization, comprising:
a data packet of NMEA protocol receiving module, configured to receive a data packet of NMEA protocol, read a valid UTC time from the data packet of NMEA protocol, and store the read valid UTC time in a time synchronization controller;
a PPS signal receiving module, configured to receive a PPS signal, capture a local time output by a local clock at a time when the PPS signal is generated, and store the local time in the time synchronization controller;
a time matching module, configured to, when the time synchronization controller receives the current local time, read a last local time stored before the current local time and read the stored latest UTC time as a UTC time corresponding to the last local time; and
a local clock synchronization module, configured to determine, by the time synchronization controller, a local time correction amount according to the last local time and the UTC time corresponding to the last local time, and correct the local clock according to the local time correction amount.

* * * * *